Jan. 28, 1964 R. W. CHRISTY 3,119,707

METHOD FOR THE DEPOSITION OF THIN FILMS BY ELECTRON DEPOSITION

Filed March 31, 1960 2 Sheets-Sheet 1

ROBERT W. CHRISTY
INVENTOR.

BY Gerald Sergy
AGENT.

Albert Rosen
ATTORNEY.

METHOD FOR THE DEPOSITION OF THIN FILMS BY ELECTRON DEPOSITION

Filed March 31, 1960 2 Sheets-Sheet 2

ROBERT W. CHRISTY
INVENTOR.
BY Gerald Singer
AGENT.
Albert Rosen
ATTORNEY.

United States Patent Office 3,119,707
Patented Jan. 28, 1964

3,119,707
METHOD FOR THE DEPOSITION OF THIN FILMS BY ELECTRON DEPOSITION

Robert W. Christy, Norwich, Vt., assignor to Space Technology Laboratories, Inc., Los Angeles, Calif., a corporation of Delaware Filed Mar. 31, 1960, Ser. No. 19,022
15 Claims. (Cl. 117—37)

This invention relates to a method for utilizing an electron beam for depositing a thin film of material and more particularly to apparatus and method for utilizing an electron beam to sequentially deposit a thin electrically conductive material and a polymerized cross-linked thin insulating film, in predetermined and selective areas.

In this invention any reference to thin films whether conductive or insulative refers to films of not more than 1000 angstroms thick. The need for thin insulative films has been demonstrated over and over again and especially in the microminiature filed where it is necessary to achieve smaller, lighter and more reliable electrical apparatus. In the investigation of the electrical properties of materials at very low temperatures it has been found that electrical resistance of many materials drops abruptly as the temperature approaches absolute zero (zero degrees Kelvin). It has been suggested that an entire computer or a large part of a computer can be made in a single process whereby conductive elements in the form of electrodes may be deposited onto a substrate constructed in the form of blocks of pure silicon or germanium and that the subsequent diffusion of the electrode material into the block forms the desired junction. The deposition of subsequent dissimilar conductive materials such as magnet materials and conductors to form coincident current magnetic core memory planes has been suggested as a possible means to construct an entire memory device in a single operation. In the field of microminiature printed systems it has been demonstrated that utilizing a film having a thickness less than 1000 angstroms will make it feasible to have single intersection cryotrons or other switching components that fit into a 0.1 micron square. Thus even allowing 92% of the available area on a substrate for waste space and interconnections, the component density in a finished circuit could be 50 million per square inch per layer. Layers of cryotron circuitry can be isolated from one another by superconductive shielding films deposited between layers of circuitry. Holes in the shielding film would allow magnetic coupling between layers of circuitry. It was suggested further that more than 10,000 layers per inch could be formed, thereby giving a volume density of 5 times $10^{11}$ components per cubic inch. This means of course that present day computers could be reduced to the size of a cigar box or similar article.

As mentioned above superconductive circuitry and particularly superconductive circuits have shown great promise in the computer and related fields due to their inherent high speed of operation and small size. It has been determined that with effective utilization of such arrangements speeds of the order of 10 millimicroseconds and less are realizable only when superconductive elements are made in the form of thin films of the order of less than 0.1 micron. It also appears that the gating circuit gain (the ratio of the control and controlled currents) is appreciably reduced as the thickness dimension of its superconductive elements is reduced. Applications of superconductive material and the need for thin films are more completely described and claimed in a co-pending application S.N. 1,458, filed January 11, 1960, and entitled "Control Arrangement" by John L. Rogers and assigned to the same assignee as the present invention.

Heretofore thin films have been deposited by means of vacuum evaporation techniques or so-called flashing techniques similar to the gettering techniques used to evacuate tubes. These processes do produce thin films of a certain limited quality that have been satisfactory for testing apparatus and special purpose devices where great effort and expense could be expended on a single film. The need therefore is for a system and method that will produce thin insulative and conductive films in a reliable and cheap manner and of consistent quality. The recent experiments carried out in the superconductive fields have shown that a single defect in any of the films of a packaged element will cause the rejection of the complete package.

In this invention there is disclosed a system for producing thin films comprising a substrate material located within an evacuated chamber, means for enveloping the interior of said chamber with molecules of a polymerizable material, means for generating and directing a beam of electrons against said substrate material whereby the vapor molecules are cross-linked to produce a thin insulating film, and means for maintaining a resultant positive charge on said substrate material whereby additional electrons are attracted to said substrate material.

There is further disclosed a system for producing a complex electrical apparatus of thin films comprising a substrate material located within an evacuated chamber, means for enveloping the interior of said chamber with the vapor molecules of a metal-organic compound, means for generating and directing a beam of electrons against said substrate material whereby a metal film is formed as the vapor molecules adsorbed on the substrate are decomposed by said electron beam, means for substantially removing the remaining vapor molecules of said metal-organic compound, means for enveloping the interior of said chamber with molecules of a polymerizable material, means for directing a beam of electrons against said metal film sufficient to cause the vapor molecules to be cross-linked and thereby grow a polymerized film, and means for substantially removing the remaining molecules of polymerizable material.

The apparatus produced with the system described above comprise a polymerized film formed on one side of a first electrically conductive material and a second electrically conductive material formed directly on the other side of said polymerized film. In addition superconductive circuits comprising a thin film of nonferromagnetic superconductive element and a thin film ferromagnetic superconductive element mounted directly on opposite sides of a polymerized film may be constructed.

The method for producing these and other thin film electrical apparatus comprises the steps of locating a substrate material within an evacuated chamber, then enveloping the interior of said chamber with molecules of a polymerizable material, and then directing a beam of electrons against said substrate material whereby the vapor molecules are cross-linked to produce a thin insulating film, the substrate material being maintained in a positive charged condition during the bombardment by the beam of electrons.

Further objects and advantages of this invention will be made more apparent as the description progresses reference now being made to the accompanying drawings wherein.

Figure 1:
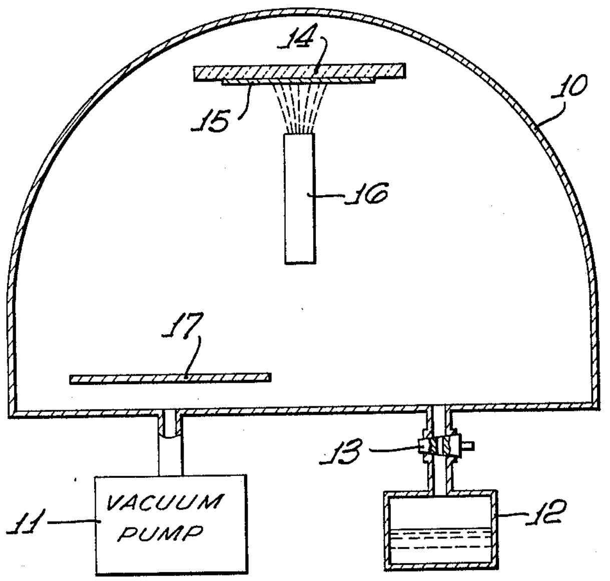
FIG. 1 illustrates the necessary apparatus for producing thin films.

Referring now to FIG. 1 there is shown an embodiment for preparing a film according to the teaching of this invention. There is illustrated an evacuated chamber such as bell jar 10 together with a diffusion oil pump 11 used to provide the necessary low pressures needed. A separate container 12 is arranged to communicate through a spicket 13 into bell jar 10 in such a manner so as to allow selected materials in container 12 to be added into the atmosphere within bell jar 10. Located within bell jar 10 is a suitable substrate material 14 arranged to hold the thin film apparatus being prepared. In the embodiment to be described it will be assumed that an electrically conductive material such as metal film 15 has been previously deposited on substrate 14 by techniques well known in the art. As the description progresses it will be apparent that the teachings of the present invention include the producing of thin insulative films and thin electrically conductive films. An electron gun 16 is suitably placed within bell jar 10 and directed at metal film 15 that is to be covered with the insulative film. A cooling baffle 17 is also located within bell jar 10 and is used to prevent the oil from pump 11 from contaminating the atmosphere within bell jar 10. The molecules of polymerizable compounds used are selected from a class that can be readily polymerized by means of a bombarding electron stream in which the bombarding electrons cause the molecules to be cross-linked and thus to form a solid polymer film. The organic silicone polymers have been used because of their dielectric qualities and have been highly successful in producing films that are continuous down to thicknesses of the order of 50 angstroms. In addition, siloxanes, particularly polydimethylsiloxane, are among the polymers that have been examined. A commercially available silicone oil vapor such as DC704, manufactured by the Dow Corning Company of Midland, Michigan, has been used very successfully in producing the continuous thin insulating films mentioned above. In the original experiments the same silicone oil used in the diffusion pump was chosen for container 12 in order to avoid contamination between the pump oil and the experimental silicone vapor used in the system. FIG. 1 illustrates the use of a separate baffle 17 together with a separate container 12 for the possible use in a system where a different oil is chosen from that used in pump 11. The operation of cooling baffle 17 to trap the oil molecules is well known in the art and is more fully described in combination with a complete system in co-pending application S.N. 863,138 entitled Vacuum Deposition Arrangement, by Eugene C. Crittenden, Jr., and John N. Cooper and filed December 31, 1959. In practicing the process, a separate source of silicone oil held at room temperature and having a surface area of approximately 30 cm.$^2$ was placed in the system by means of spicket 13 having the desired cross sectional area. It was found that the presence of this source increased the rate of film formation by approximately 20%. The total pressure in the vacuum system was found to vary between 4 times $10^{-6}$ and 2 times $10^{-5}$ mm. Hg. The electron beam source is illustrated as an electron gun 16 that was placed approximately two inches from the substrate. Where it was desired to cover the metal film 15 in mass, the electron beam was defocused so that a spot of uniform current density of approximately 2 mm. in diameter was obtained on the substrate, the gun being operated with an accelerating voltage of approximately 225 volts. The electron beam has the effect of cross-linking the vapor molecules of the polymerizable material used and thereby produces a thin insulation film. The rate of film formation was found to be insensitive to the total pressure but very sensitive to the partial pressure of the oil. It was discovered further that the films which are formed can be seen whenever they are thicker than approximately 200 angstroms since they are slightly absorbing. The electrical resistivity of the film material was found to be greater than $10^{14}$ ohm-cm. at low voltage and the current voltage characteristic was found to be approximately exponential over at least six orders of magnitude of current for the thinner films, the electrical breakdown strength being of the order of $10^7$ volts per cm. Films produced according to this process may be formed at room temperature and thicknesses have been successfully and reliably reproduced. It can be appreciated that the disclosed system and apparatus can be used to insulate metals which cannot be heated to high temperatures and that different or identical metal layers can therefore be maintained in very close proximity, the second metal layer being placed in direct contact with the thin insulative film by any of the well known methods or those described in this invention. Tests have indicated that when a metal film such as tin is used, a cross-linking is effected by using an electron beam of approximately 0.1 to 0.5 ma./cm.$^2$ current density, the electron accelerating voltage being of the order of 225 volts. The general theory of using an electron beam to effect polymerization is described in Patent Number 2,870,360 issued to M. Knoll, et al.

Figure 2:
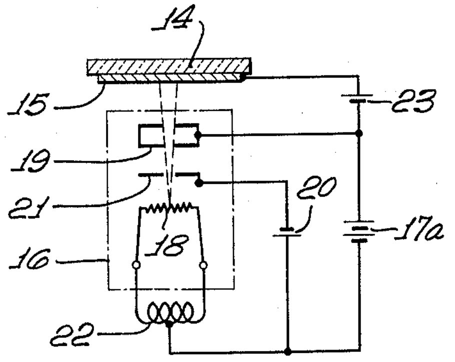
FIG. 2 is a schematic diagram of a first embodiment illustrating the electrical connections between the electron gun and a substrate.

Referring now to FIG. 2, there is shown a schematic diagram illustrating the voltage connections applied to electron gun 16 for effecting the cross-linking on metal film 15. For example, where the metal film 15 is ten, a voltage of approximately 230 volts as indicated by battery 17*a* was applied between filament 18 and anode 19 of electron gun 16. A focusing voltage illustrated by battery 20 was connected between grid 21 and filament 18 of electron gun 16. The filament voltage is supplied by means of a center tapped secondary coil 22 of a filament transformer not illustrated. In the performance of the invention it was discovered that consistent results were always obtained when metal film 15 was made at least equal to or more positive than anode 19. As a result, it was discovered that by placing a 90 volt potential source as indicated by battery 23 between anode 19 and metal film 15 uniformly improved results were obtained in producing the thin films mentioned above.

The theory that purports to explain the phenomenal success of the method and apparatus described herein is not uniformly accepted; however, it does explain the failures of the films produced by the prior art methods. One field of thought suggests that electrons from electron gun 16 cause the surface of metal film 15 to assume a negative charge which produces a repulsive electric field that is stronger at the promontories existing on metal film 15. This electric field effectively repulses additional electrons at the promontories thereby providing the basis for a defective film. It is believed that battery 23 maintains conductive member 15 positive with respect to anode 19 of electron gun 16 and in this manner the metal film 15 always attracts more electrons by providing an immediate path for the dissipation of any negative charge that might accumulate. Similar results should also be expected by directly connecting metal film 15 with anode 19 of electron gun 16.

Figure 3:
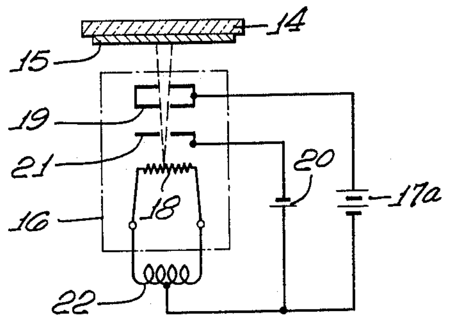
FIG. 3 is a schematic diagram of a second embodiment illustrating the electrical connections between the electron gun and a substrate.

Referring now to FIG. 3 there is shown a second schematic diagram similar to that shown in FIG. 2, differing only in the elimination of battery 23 which was previously described as being used to make metal film 15 more positive than anode 19. Under certain conditions the circuit illustrated in FIG. 3 will produce the same consistent result as that produced by the schematic circuit illustrated in FIG. 2. This seeming anomaly will be explained with reference to FIG. 4.

Figure 4:
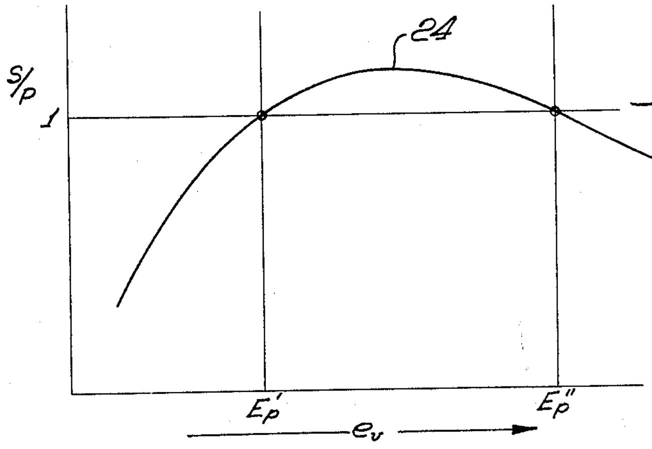
FIG. 4 is a graph illustrating the preferred operating potential limits for the embodiment illustrated in FIG. 3.

Referring now to FIG. 4 there is shown a graph which represents the number of secondary electrons emitted per primary electron versus the energy of the electron beam as expressed by the accelerating voltage. It is well known that almost all metals and some insulators will emit secondary electrons when bombarded by electrons. The number of secondary electrons emitted per primary electron depends upon such things as for example the velocity of the primary bombarding electron and the nature and condition of the material composing the surface being bombarded. The curve 24 in FIG. 4 is representative of tin and illustrates that with increasing potential on the primary bombarding electron, the ratio of secondary to primary electron increases to a maximum and then decreases. As mentioned previously, the exact range of values is a function of the target metal and varies with the metal or metal compounds used. Curve 24 however is representative of most metals. When depositing an insulating film utilizing the floating circuit configuration illustrated in FIG. 3, it has been found necessary to use operating potentials on anode 19 of electron gun 16 that lie within the range E*p*′ and E*p*″ illustrated in FIG. 4. The significance of these operating limits will be realized when it is observed that these voltages define those parts of curve 24 wherein the number of secondary electrons emitted from the target is at least equal to the number of electrons impinging upon the target, which is signified by the number 1 on the ordinate of the graph. By operating the potentials within these defined limits it will be recognized that the arrival of an impinging electron will cause more than one electron to be removed from the target substrate thereby leaving the substrate with an effective positive charge with respect to its original condition. The effect therefore is to attract electrons to the target substrate surface thereby properly producing a thin film by the polymerizing process. A complete family of curves of different metals can be obtained by referring to the handbook entitled "Encyclopedia of Physics" edited by S. Flügge, Volume XXI, entitled "Electron-Emission Gas Discharges I" printed in 1956 and more specifically to the article entitled Sekundarelektronen-Emission fester Korper bei Bestrahlung mit Elektronen by R. Kollath, beginning on page 232, and the family of curves shown in Fig. 34 on page 266 and the explanatory Tabelle 2 on page 267.

Figures 5, 6, 7, 8:
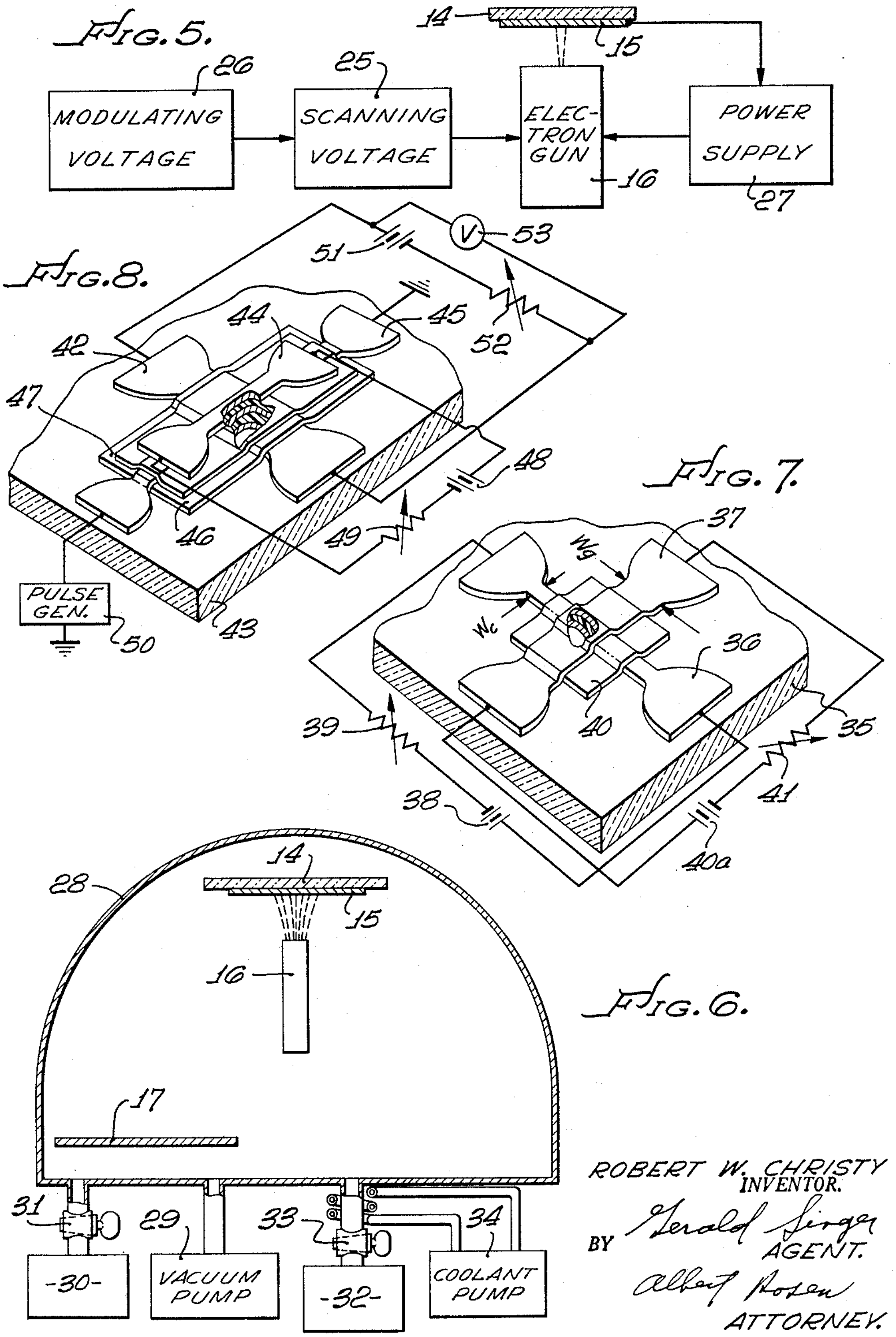
FIG. 5 is a block diagram of an embodiment illustrating how the placement of the thin films may be controlled.
FIG. 6 illustrates a preferred embodiment for depositing insulative films and conductive materials in a continuous sequential operation.
FIG. 7 illustrates a first embodiment of a superconductive element produced according to the teachings of this invention.
FIG. 8 illustrates a second embodiment of a superconductive element produced according to the teachings of this invention.

Referring now to FIG. 5, there is shown a system for controlling the voltages fed to electron gun 16 to thereby control the placement of the deposited films. In the manufacture of printed circuits or the manufacture of superconductive elements in which the thickness of the films used is at times impossible to be observed it is necessary to have a completely automatic system for producing the films. FIG. 5 illustrates a convenient system of utilizing a scanning voltage 25 for controlling the deflection and movement of the electron beam generated by electron gun 16. The scanning voltage 25 is in turn controlled by a suitable modulating control illustrated as 26. A suitable power supply 27 is shown connected between the target electrode 15 and the electron gun 16 for convenience only since it is obvious that either of the connections illustrated in FIG. 2 or FIG. 3 could be used for controlling the electron beam.

The discussion of the invention up to this point has been concerned primarily with the method and apparatus for producing a thin insulative film. However, as will presently be described, the method and apparatus described is also adaptable for producing electrically conductive films.

Referring now to FIG. 6 there is shown a bell jar 28 together with an oil diffusion pump 29 used to evacuate the atmosphere within bell jar 28. A first container 30 adapted to hold a suitable polymerizable material of the type previously disclosed, such as the silicone oil, communicates with the interior of bell jar 28 through a spicket 31. A second container 32 is arranged to hold a metallic compound that will form the basis for the electrically conductive film to be placed on the substrate. A metal-organic compound such as tetraphenyl tin or tetraethyl lead are suitable materials. It will be understood that the vapor of any suitable metal organic compound may be used. Container 32 communicates with the interior of bell jar 28 through spicket 33. Exterior to bell jar 28 is a suitable cooling pump 34 arranged to circulate nitrogen around that portion of container 32 that communicates with bell jar 28. In a similar manner, as described for FIG. 1, there is located within bell jar 28 a substrate 14, and suitable baffling as described for FIG. 1. The procedure for producing a conductive coating on substrate 14 is very similar to that described for FIG. 1 for producing an insulative film. For example, pump 29 is used to evacuate the interior of bell jar 28 in the conventional manner. When it is desired to coat substrate 14 with a conductive member it is necessary that spicket 31 be closed and baffle 17 be cooled with a coolant such as nitrogen for trapping the oil molecules so as to prevent contamination of the atmosphere with the oil molecules. Spicket 33 is then opened in order to release the vapors of the metal-organic compound from within container 32. The vapor pressure of the metal-organic compound will cause the molecules to be present on substrate 14 in equal pressures and a metal film will be formed when vapor molecules adsorbed on the surface are decomposed by the electron beam. A reasonable rate of film growth can be expected by controlling the vapor pressure of the metal compound to approximately $10^{-9}$ mm. Hg or greater. The theory and process described for producing a conductive coating is essentially the same as that described for producing the thin insulating films. The electrical circuits and connections illustrated in either of the FIGS. 2 or 3 may be used and, further, the modulating and scanning voltages described with reference to FIG. 5 may also be used to control the placement of the conductive film. It is conceivable and desirable that for large scale manufacturing techniques the modulating voltage 26 illustrated in FIG. 5 may be produced from an automatic device such as punched cards or tapes or other similar predetermined means. Compared to other techniques used to deposit a conductive film, it will now be appreciated that this invention describes a system and method for using an electron beam directly to effect a deposition of the metal film on prescribed areas of the substrate without the necessity of etching or masking or other removal techniques. After the metal or conductive film has been deposited it is necessary to operate the nitrogen coolant pump 34 with spicket 33 opened so as to cause a heat sink effect in which the vapors of the metal-organic compounds are drawn back into container 32. Spicket 33 is then closed in order to prevent the same metal molecules from contaminating the atmosphere when it is desired to deposit an insulating film. In order to produce a thin insulating film it is necessary that spicket 31 be opened and that the cooling means associated with baffle 17 be shut off to thereby allow the vapor pressure of the polymerizable material to envelope the atmosphere within bell jar 28. The procedure for depositing an insulative film is now the same as that described for FIGS. 1 to 5. In order to produce a series of conductive or insulative members it is only necessary to repeat the process to produce a complete module. The complete process is adaptable for use in a completely automated system in which the process from start to finish would be controlled either by punched cards or tapes. It will be appreciated, therefore, that in the processes described in this invention it is not necessary to heat the substrate and as a result it is possible to insulate metals which cannot be heated to high temperatures. In addition it is possible to bond dissimilar metals to opposite sides of a cross-linked polymerized thin film. The advantages of such a device will now be described with reference to FIGS. 7 and 8.

Referring now to FIG. 7 there is shown one form of a gating device constructed in accordance with the present invention. Devices of this nature, in combination thereof, have been used to perform many of the well known logical functions in the computer art and have been described more fully in U.S. Patent No. 2,832,897 entitled "Magnetically Controlled Gating Element" granted to Dudley A. Buck. The gating device illustrated in FIG. 7 comprises an insulating substrate 35 such as a sheet of glass upon which a thin film superconductive switching or control element 36 has been deposited according to the procedure outlined in accordance with FIG. 6 of this invention. Adjacent to control element 36 and extending in a direction transverse to the element 36 is mounted an elongated, thin film superconductive gate element 37 with the two elements 36 and 37 being separated and insulated from each other by a thin cross-linked film 40 produced according to the teachings of FIGS. 1 to 6 of the present invention. Control element 36 is made of a material having a much higher transition temperature than the material of the gate element 37. The wide difference in the transition temperatures of the two elements 36 and 37 is to insure that the control element 36 will remain superconducting during the operation of the gating device. In addition, the width of the control element 36 is preferably substantially smaller than the width of the gate element 37. The control element 36 is connected to a voltage source 38 in series with a variable resistor 39 which can be controlled to have a desired level of current through the control element 36. Similarly, the gate element 37 is connected in series with a voltage source **40*a* through a variable resistor 41**. The particular metals used and thickness desired for the gating element and the control element are more fully described in the previously referred to patent application entitled "Control Arrangement" by John L. Rogers.

Referring now to FIG. 8 there is shown, in a partly diagrammatic and partly schematic view, a memory unit incorporating a ferromagnetic superconductive gate element constructed according to the teachings of the present invention. The device illustrated in FIG. 8 is actually a bistable or non-destructive memory unit constructed from a single gating device employing a ferromagnetic superconductive gate element that can be made to perform substantially the same logical functions that would require at least six gating devices not employing a ferromagnetic gate element. In the manufacture of such a device a single ferromagnetic gate element 42 is deposited on a substrate 43, according to the teachings of the present invention. Element 42 is crossed by a pair of nonferromagnetic control elements, namely, a bias control element 44 and a setting control element 45. As in the gating device previously described in connection with FIG. 7, both the bias control element 44 and the setting control element 45 are formed from a superconductive material having a higher transition temperature than the material of the gate element 42 so that the control elements 44 and 45 will remain superconductive at the operating temperature. The control elements 44 and 45 may be mounted on the same side of the gate element 42 as shown, or they may be mounted on opposite sides. In any case, the manufacture of the individual films or conductive elements is suitably controlled and manufactured by the method described in FIG. 6 of the present invention in combination with suitable modulating and controlling voltages as illustrated in FIG. 5. The bias control element 44 is connected in series with a voltage source 48 and a variable resistor 49 which is adjustable to apply a desired amount of current to the bias control element 44 and to thus supply a magnetic biasing field to the gate element 42. The setting control element 45 is connected to a pulse generator 50 from which current pulses of either positive or negative polarity supplied to the setting control element 45 serve to apply magnetizing fields to the gate element 42. The gate element 42 is connected to a sensing circuit including a voltage source 51 in series with a variable resistor 52 and a sensing device 53 such as a voltmeter connected across the gate element 42. The voltmeter being used to sense voltage changes across the gate element thereby senses the state of the gate element. When the gate element is superconductive, the sense voltage is zero; but when the gate element is resistant, a voltage is produced across the gate element. The complete theory of operation of this device is more fully disclosed in the referred to application of John L. Rogers.

This completes the description of the embodiments of the invention disclosed and illustrated herein. However, many modifications and advantages thereof will be apparent to persons skilled in the art, without departing from the spirit and scope of this invention. Accordingly, it is desired that this invention not be limited to the particular details of the embodiments disclosed herein except as defined in the appended claims.

What is claimed is:

1. A method for producing thin films which comprises the steps of locating a substrate material within an evacuated chamber, then enveloping the interior of said chamber with molecules of a polymerizable material, whereby molecules are adsorbed onto the substrate, and then directed a beam on electrons against said molecules adsorbed on said substrate material whereby the vapor molecules are cross-linked to produce a thin insulating film, the mean free path of electrons and molecules being many times greater than the distance traveled by the electrons through the chamber, the substrate material being maintained in a positive charged condition during the bombardment by the beam of electrons.

2. A method for producing thin polymer films which comprises the steps of placing an electrically conductive substrate material within an evacuated chamber, then enveloping the interior of said chamber with molecules of polymerizable material, whereby molecules are adsorbed onto the substrate and means for directing a beam of electrons against said molecules adsorbed on said substrate material whereby the vapor molecules are cross-linked to produce a thin insulating film, the mean free path of electrons and molecules being many times greater than the distance traveled by the electrons through the chamber, said substrate material being maintained with a resultant positive charge so as to attract additional electrons and thereby polymerize the molecules of polymerizable material.

3. A method for producing thin polymer films that comprises the steps of placing a metal film in direct contact with a polished substrate material and located within an evacuated chamber, then enveloping the interior of said chamber with molecules of a polymerizable material, whereby molecules are adsorbed onto the substrate, and then directing an electron beam at said molecules adsorbed on said metal film whereby the vapor molecules are cross-linked to produce a thin insulating film, the mean free path of electrons and molecules being many times greater than the distance traveled by the electrons through the chamber, said metal film being provided with a return path to allow the accumulated electrons to be removed and thereby advance the cross-linking of the thin film.

4. A method for producing thin films that comprises the steps of locating a suitable substrate material within an evacuated chamber, then enveloping the interior of said chamber with the vapor molecules of a metal-organic compound, then directing a beam of electrons against said molecules of said metal organic compound adsorbed on said substrate material whereby a metal film is formed as the vapor molecules are adsorbed on the substrate and are decomposed by said electron beam, then removing the remaining vapor molecules from within said evacuated chamber, then enveloping the interior of said chamber with molecules of a polymerizable material, then directing the beam of electrons against said molecules of said polymerizable material adsorbed on said metal film sufficient to cause the vapor molecules to be cross-linked and thereby grow a polymerized film, then substantially removing the remaining molecules of polymerizable material, then again enveloping the interior of said chamber with the vapor molecules of a metal organic compound, and then directing a beam of electrons against said molecules of said metal organic compound adsorbed on said polymerized film whereby a metal film is formed as the vapor molecules adsorbed on the polymerized film are decomposed by said electron beam, the vapor molecules of both the metal-organic compound and the polymerizable material being introduced into the chamber at such low pressure that the mean free path of electrons and molecules being many times greater than the distance traveled by the electrons through the chamber.

5. A method of producing thin insulating film in a high vacuum by electron bombardment comprising the steps of: disposing a substrate in a high vacuum atmosphere containing a vapor of polymerizable material that is adsorbed onto the substrate, directing a low current intensity beam of electrons against the substrate to progressively grow a thin polymerized film on the substrate in the regions bombarded by the beam, and maintaining a resultant positive charge on said substrate whereby additional electrons are attracted to said substrate.

6. A method of growing a thin film of polymerized material in a predetermined pattern on a substrate comprising the steps of: producing a high order vacuum atmosphere about the substrate, introducing a vapor of polymerizable material into the vacuum atmosphere while maintaining a high order vacuum, whereby in this environment molecules of the vapor are progressively adsorbed onto the substrate, bombarding the substrate by a low intensity electron beam in the pattern desired to progressively grow a thin film on the substrate at the bombarded positions by polymerizing the material, and maintaining the substrate in a condition to retain electrons applied to its surface.

7. A method of progressively growing a thin film of polymerized material of 1000 angstroms or less in thickness, in a predetermined pattern on a substrate at ambient temperatures, comprising the steps of: providing a low order vacuum atmosphere containing vapor molecules of said polymerizable material, immersing the substrate into said atmosphere such that molecules of the vapor are progressively adsorbed onto the substrate, directing a low current intensity beam of electrons against the substrate in the desired pattern to polymerize the adsorbed molecules at those positions of the substrate receiving the beam, the relationship of the order of vacuum maintained and the low current density of the beam being such as to provide relatively few collisions of electrons with molecules in the vapor whereby the polymerization of the material to form the thin film occurs predominantly on the substrate and at those discrete positions receiving the electron beam, and maintaining the electrical potential of the substrate in condition to receive the electrons from the beam.

8. A method of polymerizing a vapor at ambient temperatures to provide a thin film on a substrate, comprising the steps of: disposing the substrate in a high vacuum atmosphere containing the vapor, directing a low current intensity beam of electrons to progressively bombard the substrate in the pattern desired to form the thin film, the partial pressure of the vapor within the high vacuum atmosphere being sufficiently low that the mean free path between electrons and vapor molecules is greater than the distance traversed by the electrons through the high vacuum atmosphere, whereby the collisions between the electrons of the beam and the molecules of vapor occur primarily on the substrate to progressively grow the thin film only at these positions on the substrate that receive the electron beam.

9. A method of polymerizing a thin film onto a substrate from a high vacuum vapor of polymerizable material maintained at ambient temperature comprising the steps of: introducing a vapor of said polymerizable material into a chamber containing said substrate at a high vacuum atmosphere and at ambient temperature to maintain a very low density of molecules of said vapor within said chamber, directing a low current intensity beam of electrons against said substrate to polymerize the molecules of said vapor adsorbed thereon, the relationship between the number of vapor molecules within said chamber and the current intensity of the beam being such that the polymerization of the material occurs predominantly with respect to the adsorbed molecules on the substrate and not the molecules in the vapor, whereby the thin film is produced on the substrate only at those positions that are bombarded by the electron beam.

10. A process for growing thin film comprising the steps of: providing a high vacuum atmosphere, introducing vapor molecules of a polymerizable material into said atmosphere at a very low vapor pressure in the order of about $10^{-9}$ mm. of Hg, placing a substrate in said atmosphere whereby said vapor molecules are progressively adsorbed onto the substrate, directing a low intensity beam of electrons through said atmosphere and against said substrate having a current density in the order of about 0.1 to 0.5 ma./cm.$^2$, thereby to polymerize said adsorbed molecules on the substrate at the positions where the beam is directed.

11. A process for growing thin films comprising the steps of: providing a high vacuum atmosphere, introducing vapor molecules of a metal-organic material into said atmosphere at a very low vapor pressure in the order of about $10^{-9}$ mm. of Hg, placing a substrate within said atmosphere whereby said vapor molecules are progressively adsorbed onto the substrate, directing a low intensity beam of electrons through said atmosphere and against said substrate having a current density in the order of about 0.1 to 0.5 ma./cm$^2$, thereby to decompose said adsorbed molecules on the substrate at those positions where the beam is directed.

12. A process for growing thin films comprising the steps of: producing a high order vacuum atmosphere, introducing a substrate into said atmosphere, introducing vapor molecules of a metal-organic material at very low pressure and ambient temperature into said atmosphere, whereby said molecules are adsorbed onto the substrate, directing a low intensity beam of electrons through said atmosphere against said substrate to decompose said molecules and progressively form a thin film of metal on the substrate at those positions receiving the beam, the mean free path of the electrons and molecules being many times greater than the distance traveled by the electrons through said atmosphere, removing said molecules from the atmosphere after the desired film is formed, introducing vapor molecules of a polymerizable material into said atmosphere at very low vapor pressure and ambient temperature, whereby said polymerizable molecules are adsorbed by said substrate and film, again directing a beam of low intensity electrons through said atmosphere and against said substrate to polymerize said polymerizable molecules adsorbed onto said substrate and film and thereby form a second film at those positions receiving the beam, the mean free path of the electrons and polymerizable molecules being many times greater than the distance traveled by the electrons through said atmosphere, and removing the remaining molecules of polymerizable material after said second film is formed.

13. In the process of claim 12, the step of removing the molecules of both polymerizable material and metal-organic material being performed by cooling the atmosphere.

14. In the process of claim 12, reversing the steps by first introducing into said atmosphere the vapor molecules of polymerizable material to form a thin film, and later introducing the molecules of metal-organic material to form the second film.

15. In the process of claim 14, the step of removing the molecules of both polymerizable material and metal-organic material being performed by cooling the atmosphere.

References Cited in the file of this patent

UNITED STATES PATENTS

| | | |
|---|---|---|
| 2,421,787 | Helmuth | June 10, 1947 |
| 2,754,225 | GFeller | July 10, 1956 |
| 2,932,591 | Goodman | Apr. 12, 1960 |
| 2,936,435 | Buck | May 10, 1960 |
| 2,962,681 | Lentz | Nov. 29, 1960 |

FOREIGN PATENTS

| | | |
|---|---|---|
| 564,177 | Canada | Oct. 7, 1958 |
| 488,131 | Great Britain | July 1, 1938 |